Figure 1:
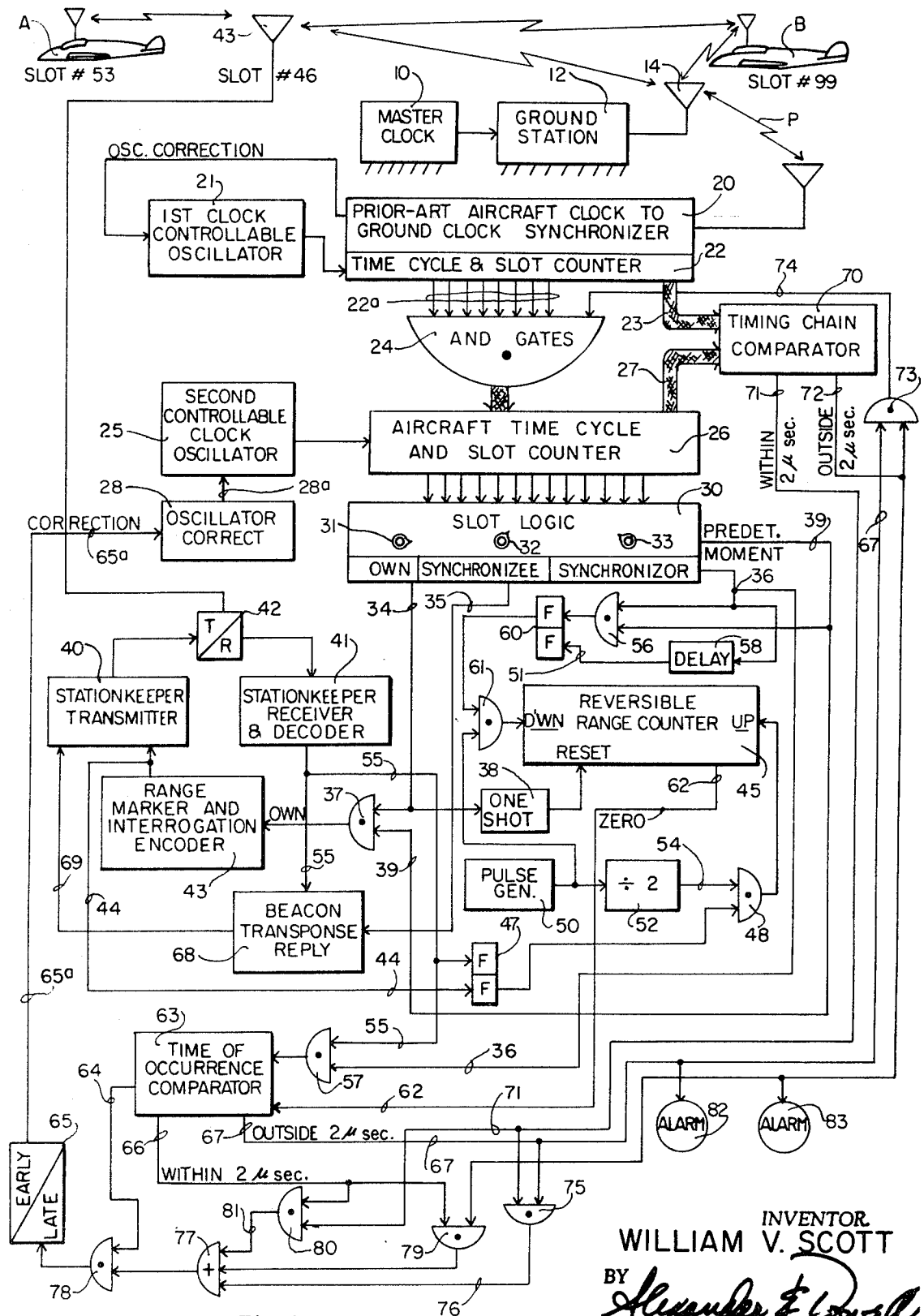

United States Patent [19]
Scott

[11] 3,737,901
[45] June 5, 1973

[54] REDUNDANT AIRCRAFT CLOCK SYNCHRONIZATION

[75] Inventor: William V. Scott, Depew, N.Y.

[73] Assignee: Sierra Research Corporation, Buffalo, N.Y.

[22] Filed: May 3, 1971

[21] Appl. No.: 139,470

[52] U.S. Cl..................343/7.5, 178/69.5 R, 325/4, 343/6.5 LC
[51] Int. Cl................................................G01s 9/56
[58] Field of Search......................343/6.5 LC, 7.5; 325/4; 178/69.5 R, 15 BS; 340/23

[56] References Cited
UNITED STATES PATENTS

| 3,566,404 | 2/1971 | Sorkin | 343/7.5 X |
| 3,564,545 | 2/1971 | Gottlieb et al. | 343/6.5 LC |
| 3,250,896 | 5/1966 | Perkinson et al. | 343/7.5 X |
| 3,564,544 | 2/1971 | Scott et al. | 343/7.5 X |

Primary Examiner—Benjamin A. Borchelt
Assistant Examiner—G. E. Montone
Attorney—Alexander & Dowell

[57] ABSTRACT

An air traffic system in which participating aircraft occupy uniquely assigned time slots and have first time clock means which are assumed to be already finely synchronized to a ground-based master time clock by signal exchanges with ground stations and have second time keeping means in each aircraft which are synchronized first to the master time clock and are thereafter further and more finely synchronized to other aircraft nearby, to provide a desirable degree of redundancy while also remaining within the limits of the ground station imposed synchronization. Each aircraft in the illustrative embodiment selects by time-slot designation another nearby aircraft as its synchronizor, and in addition also responds to requests for synchronization by other synchronizee aircraft identified by other time-slot selection. This redundant fine synchronization among nearby synchronizor and synchronizee aircraft is especially useful in situations where large numbers of aircraft are flown close together in formations, or in groupings of commuter aircraft, for instance, in which STOL aircraft fly between cities close together, perhaps one behind the other.

14 Claims, 2 Drawing Figures

INVENTOR.
WILLIAM V. SCOTT
BY
Alexander & Dowell

REDUNDANT AIRCRAFT CLOCK SYNCHRONIZATION

This invention relates to redundant aircraft clock synchronization systems in which each aircraft has a first time-keeping means synchronized to a ground-based master time clock and a second time keeping means synchronized to nearby aircraft, the system being particularly useful in obtaining an extra fine degree of mutual synchronization of the second time keeping means in the various aircraft, thereby permitting the aircraft to be flown safely with relatively small mutual separations.

In considering aircraft flight patterns which will be used in the future to transport large numbers of persons, especially in STOL shuttle systems between major systems, it becomes apparent that there will be continuously travelling trains of aircraft all flying the same course, one behind the other, and under crowded conditions probably only a few thousand feet apart. If the aircraft are to navigate this close together, the degree of clock synchronization required for collision avoidance and station-keeping will be much closer than that which is presently in use. It is to the achievement of degrees of accuracy of the order of nanoseconds that the present invention is addressed. If such degrees of synchronization can be reliably accomplished between nearby aircraft, then the aircraft can be safely and routinely flown with mutual separations of something between a 1,000 and 4,000 feet, with separations of, for instance, 2,000 feet being considered practical for operational conditions. It is also assumed that there will be occasional gaps in the formations or trains of aircraft so as to permit insertion of other aircraft into the train, where such other flights are initiated from intermediate points along the route of the main train. For example, in flying from New York to Washington the train may have aircraft dropping out at Philadelphia, and/or joining the train at Philadelphia or other intermediate points.

There are a number of systems for providing a degree of synchronization which has been referred to as "fine," such as the system shown in the Lennon U.S. Pat. No. 3,487,407, or in the Michnik U.S. Pat. No. 3,336,591, or in the pending Michnik patent application, Ser. No. 754,073, filed Aug. 20, 1968, and entitled "Mobile Clock Synchronization Techniques." These are the systems which provide synchronization to within 1 or 2 microseconds, and it is from this point that the present invention seeks to make further improvement.

It is an object of the present invention to provide a system in which the various aircraft participating in a train are all assigned specific time slots which repeat over and over again in a cycle to provide uniquely occupied time intervals during which each aircraft is operative to obtain extra-fine synchronization from another aircraft in the train, these time slots being used in the present invention to identify the particular aircraft occupying them. Thus, if an aircraft is flying in a train behind the aircraft occupying time slot No. 53 and ahead of the aircraft occupying time slot No. 99, this aircraft can also be identified in the train as being the aircraft occupying, for instance, time slot No. 46. The number of time slots can be determined in any suitable manner, and should probably comprise at least 1,000 or more.

It is a principal object of this invention to provide a system in which an aircraft in the train interrogates a nearby aircraft, such as the aircraft immediately ahead of it, for the purpose of obtaining synchronization from that aircraft, and also concurrently transponds to interrogations during other time slots initiated by other nearby aircraft such as the aircraft following it, whereby it also synchronizes said other aircraft. This system can of course be altered somewhat from the above proposed example in which each aircraft synchronizes only the aircraft following it, to provide a system in which one or more of the participating aircraft may synchronize multiple aircraft around it if the requirements of a particular operation make such a system desirable. In any event, the time slots will keep the interrogations separated in time so that confusion never exists as to which aircraft is interrogating and which aircraft is replying at any particular moment in time.

It is another major object of the invention to provide a redundant time clock system in which each aircraft has two similar time keeping means, the first such means in each aircraft being a complete time clock synchronized to ground station master time and being compared with a second time keeping means in each aircraft synchronized very closely with the corresponding clock means in another nearby aircraft. In this disclosure the second time keeping means may comprise either another complete time clock, or in a more economical system may comprise only a second timing chain driven by the clock oscillator of the first time clock. In all cases, it is assumed that each aircraft approaching the train for the purpose of becoming part of it has already had its first and second clock means synchronized to a fine degree to master clock means in a ground station using one of the various prior-art synchronizing means. The present disclosure is concerned not only with the concept of separating the second time keeping means from the first clock means and then increasing the degree of synchronization of the second means to make it ultra-well synchronized to a nearby aircraft, which will be referred to hereinafter as achieving extra-fine synchronization; but the present disclosure is also concerned with providing means whereby the degree of synchronization of the second time keeping means is continuously compared both with the same aircraft's first clock means and also with the second time keeping means in the adjacent aircraft and then steps are taken to determine which of the comparison clock means the local second time keeping means should be synchronizing itself to. Moreover, since all aircraft in all trains are assumed to have attained an initial degree of fine synchronization by exchanging signals with a ground station to bring their first clock means within approximately 1 or 2 microseconds of the master time propagated from the ground stations, it follows that their second time keeping means should also be within this same degree of synchronization. If as a result of the comparisons made, a second time keeping means appears to be outside of a predetermined permissable tolerance, the pilot is warned immediately and the built-in logic selects a synchronization procedure most likely to result in safe navigation for the moment.

The slot numbers, by which synchronization successions are determined, are preassigned so that an aircraft entering a train at a gap therein will know already, for example, that it is to follow the aircraft occupying time slot 53 and to lead the aircraft occupying time slot 99 and that its own time slot number is 46. These time slot numbers can be manually set into the time slot logic in the local aircraft using hand switches, the switches being set to these time slot selecting positions as dictated by the ground dispatchers at the point of initiation of the flight. The switch settings once accomplished will permit the aircraft automatically to initiate interrogations during its own time slot for interrogating its extra-fine synchronization donor aircraft for the purpose of improving the degree of synchronization of its second time keeping means, and will also permit the local aircraft's transmitter and receiver to act as a beacon transponder during the time slot of its synchronizee aircraft so that it can reply to interrogations from the latter initiated thereby for the purpose of bringing its own second-clock synchronization closer to that of the replying aircraft under present consideration.

It is an advantage of the present system that the extra-fine synchronization efforts are conducted between aircraft which are very close together, and this mutual proximity greatly enhances the degree of accuracy of synchronization, especially in view of the fact that the synchronizing pulses received among the various aircraft will have very favorable signal to noise ratio with respect to the exchanged signals, so that any error contribution by the noise component will be small or insignificant.

Figure 2:
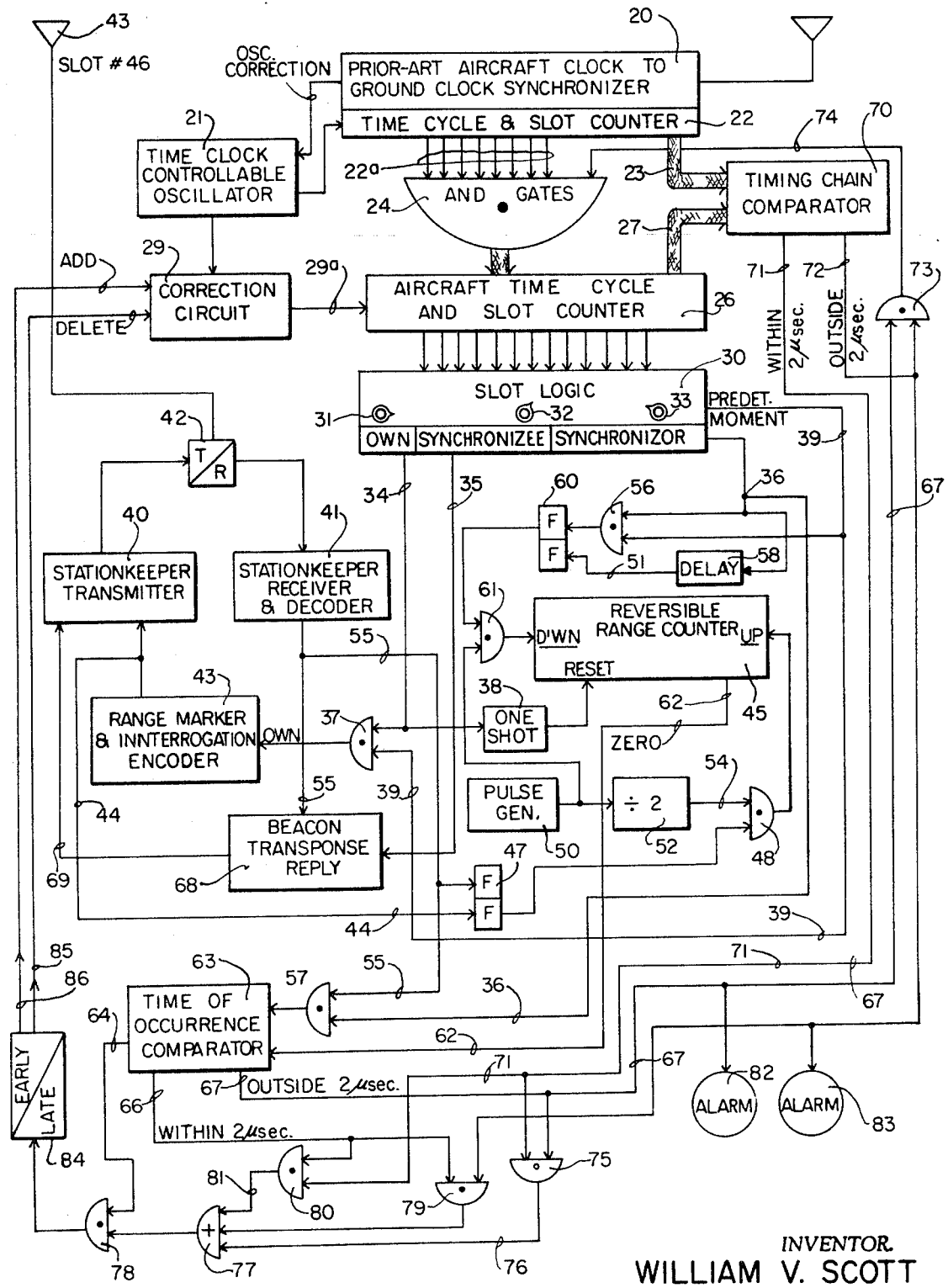

Other objects and advantages of the present invention will become apparent during the following discussion of the drawings, wherein:

FIG. 1 is a block diagram of an illustrative embodiment of the present invention employing two independent time clocks in the aircraft; and FIG. 2 is a block diagram of a modified embodiment in which the second time keeping means is more economically constructed.

As discussed above, the present invention is intended to provide an extra-fine degree of synchronization as between the second time keeping means in aircraft flying close together, for instance, in line one behind the other, and then to compare in each aircraft the degree of second-clock synchronization with the second time keeping means in the adjacent aircraft, as against the local first clock means which is synchronized with the clock in a master ground station.

In FIG. 1 three adjacent aircraft are shown, these aircraft including an aircraft A, which is in the position of leading another aircraft whose equipment is shown in detail in the present diagram and which will be referred to hereinafter as the local aircraft, and finally an aircraft B which is in a following position with respect to the local aircraft. All three of the aircraft are similarly equipped to include the circuitry shown in the present block diagram. These aircraft have been assigned definite time slots in a repeating cycle of slots, and for present purposes it will be assumed that the aircraft A occupies slot number 53, that the local aircraft occupies slot number 46, and that the aircraft B occupies slot number 99. It is by means of these preassigned slot numbers that the various aircraft are identified to the ground stations and among themselves when exchanging synchronizing and stationkeeping position signals.

On the ground there is master clock 10 comprising part of a system-wide accurate time base, and in the present embodiment it is connected to a ground station 12 to furnish it with accurate time which it can then propagate by way of its antenna 14 to the various aircraft participating in the system. Each aircraft in both FIG. 1 and FIG. 2 has a first time clock means 21, 22 including the frequency-controllable oscillator 21 driving a first time slot and cycle counter 22 by which the local aircraft counts out repeating cycles of time slots corresponding with similarly counted-out time slots at the master clock 10. The first aircraft clock means also includes an aircraft-clock to ground-clock synchronizor 20 which may be of the type shown in any one of many prior-art synchronizor patents, some of which are mentioned near the beginning of the present specification as being exemplary. This type of synchronizer is assumed, since it is a prior-art device, to accomplish and normally maintain a high degree of synchronization of the oscillator 21 and counter chain 22, the synchronization being normally within 2 microseconds, for example. The output of the first clock means 21, 22 appears on wires 22a and also on cable 23 which leads to a comparator 70. The clock output on wires 22a also goes to a plurality of AND gates 24 which can be enabled by the wire 74 in the manner hereinafter set forth to force the reading of the clock counter 22 directly into a second similar clock counter 26, for the purpose explained below. This first ground-synchronized clock system 21, 22 comprises one half of what is required in the aircraft to achieve true time clock redundancy, a major object of this invention.

The other half of the redundancy feature comprises a second time keeping means in a system which synchronizes it to an adjacent aircraft which also includes its own first clock means which is assumed to be also synchronized to the master clock 10 located on the ground. If there were perfect synchronization of both aircraft to the ground station master clock 10 at all times, then there would be no need to achieve extra fine synchronization of the various aircraft, one to another. However, the synchronization of each aircraft clock to ground Master Time may be difficult to hold much closer than 2 microseconds, i.e., due to relatively long transmission paths resulting in weakened signals and accompanying noise affecting the detected positions in time of exchanged pulses. However, since the adjacent aircraft are much closer together, it is possible to synchronize their respective second time keeping means 26 to a degree much better than the arbitrarily selected 2 microseconds used in this example. Therefore, when the above mentioned prior-art air-to-ground synchronization process has been carried out to provide an error in the first clock means of no more than two microseconds, the circuitry appearing in the diagram below the second clock means 26 is used to achieve much finer air-to-air synchronization. Moreover, the two different types of synchronization are mutually compared in each aircraft as a redundancy check designed to warn the pilot if either synchronization fails.

Referring still to FIG. 1, it is the purpose of the system to take synchronization from a nearby aircraft A to still further improve the degree of local synchronization with respect to that synchronizer aircraft A, and also to donate extra-fine synchronization from the local aircraft to one or more nearby synchronizee aircraft B so as to bring that aircraft also into very close synchronization. One of the main advantages in these air-to-air synchronization exchanges resides in the close mutual proximity of the aircraft, whereby their transmissions are virtually noise free and the pulses exchanged have very steep rise-times. It therefore follows that the aircraft which are flying closest together, and thus need the most accurate mutual stationkeeping, always enjoy the best relative synchronization while at the same time all aircraft participating in the system remain synchronized within an arbitrarily selected two-microsecond tolerance to the ground station. If the error of the second time keeping means exceeds that tolerance, logic in the local aircraft then makes a decision as to whether to revert to resynchronization with ground station time, as described below.

The extra-fine degree of synchronization is achieved among nearby aircraft using the components included in the block diagram located beneath the second time keeping means 26 in both figures. During extra-fine synchronization only small corrections in second time keeping means are made. In the two-oscillator systems shown in FIG. 1 these corrections are corrections of frequency or phase introduced by the oscillator correction circuit 28 to drag the oscillator 25 which drives the timing cycle counter 26. In the system shown in FIG. 2 the oscillator 25 has been eliminated to save the high cost of a precision oscillator, and the timing chain 26 is driven by the first clock oscillator 21 through a correction circuit 29 which adds or deletes occasional clock pulses on the wire 29a which drives the counting chain 26, whereby the latter's count is altered to bring it into closer synchronization, as will be described in more detail in connection with FIG. 2.

Each aircraft has to select three time slots in the timing cycle in order to participate. First, it has to select its own local time slot in which to transmit; second, it has to recognize and use the time slot of the leading aircraft A from which it is to receive synchronization, this aircraft being referred to as the synchronizor; and third, it has to recognize the time slot of at least one other nearby aircraft B which is referred to as its synchronizee. For these purposes, each aircraft has a slot logic circuit 30 which receives all of the outputs of the timing cycle and slot counter 26 and by means of a diode matrix sorts out the various time slots. This slot logic circuit 30 has three selector knobs on it by which it is manually set to select the three time slots according to instructions from the ground dispatcher. For instance, using the knob 31 it selects its own time slot which has been assigned to it by ground personnel and which in this case is assumed to be slot 46. Then using the selector knob 32 it selects the synchronizee slot number 99 which has been assigned to it as being the aircraft in front of which the local aircraft will fly in the case of an in-line flight formation. Then, using the selector switch 33 it selects the synchronizor of its own second time clock means, which synchronizor is the aircraft A behind which it will fly according to instructions from the ground dispatcher. These three adjustments are made by the flight crew of the aircraft prior to take off.

Each aircraft also has a stationkeeping transmitter 40 and a stationkeeping receiver and decoder 41, this equipment operating on an assigned frequency which is common to all of the aircraft stationkeeper units, interference between units being avoided by the use of time slots. The stationkeeper transmitting and receiving frequency is, however, different from the frequency used by the air-to-ground clock synchronizor 20 and the ground station 12 over the path P. The stationkeeper transmitter and receiver are connected through a duplexer 42 which is coupled to the antenna 43 by which the local aircraft communicates with the leading aircraft A and the trailing aircraft B in the manner to be presently described.

The air-to-air synchronization system about to be described in detail operates by having each aircraft during its own time slot perform a two-way range measurement with respect to the aircraft flying just ahead of it, and then perform a one-way range measurement with respect to the same aircraft during the latter's assigned time slot, subsequently comparing the two to determine the degree of mutual synchronization. Moreover, during the time slot assigned to the aircraft flying just behind the local aircraft, the latter participates in two-way range measurement performed on the part of trailing aircraft by transponding in response to interrogation thereby. This will be made clear by following the performance of the present system through a cycle of time slots. During all time slots, except time slot 46 which is the local aircraft's own slot and during time slot 99 which is the following aircraft's time slot and during time slot 53 which is the preceding aircraft's time slot, the present system does nothing but listen for other aircrafts' position marking pulse groups transmitted by them during their assigned slots for purposes of station-keeping and/or collision avoidance, depending on how the aircraft is equipped. However, when the local aircraft's own time slot number 46 finally arrives in the cycle of repeating time slots, the wire 34 becomes enabled, thereby enabling the AND gate 37 at its upper input. The signal on wire 34 is present during the local aircraft's entire time slot number 46 and therefore comprises an enabling signal which has a leading edge useful to trigger the one shot 38 which puts out a signal to reset the reversible range counter 45 at the beginning of the aircraft's own time slot. The slot logic circuit 30 also delivers an output pulse on wire 39 occurring at a predetermined instant of time during each time slot. This is the instant of time at which the aircraft occupying each time slot transmits its position marker signal. Most of the prior art clock synchronizor systems have used a predetermined moment of transmission which is not the beginning of the time slot occupied by the aircraft, but is offset later into the time slot so as to be sure that the instant of transmission is always fully within that particular time slot and cannot by small synchronization errors be shifted into a preceding time slot. For instance, if the time slot is 1,000 microseconds in length, the predetermined moment of transmission might be at 200 microseconds after the beginning of the time slot. The arbitrary predetermined moment selected in each time slot by a signal appearing on wire 39 is of no particular concern at the present time except that it must be the same for all participating aircraft.

It will be recalled that the occurrence of the aircraft's own time slot triggered the one-shot 38 to reset the reversible range counter 45 at the very beginning of the local time slot. This range counter, beginning at the predetermined moment, is counted upwardly using output from a pulse generator 50 through a divide-by-two circuit 52 which puts out pulses on the wire 54 at one-half the rate of the pulse generator 50. These pulses continuously appear on the wire 54 but can pass through the gate 48 only when its lower input terminal is enabled. This terminal is enabled by the flipflop 47 which is normally reset at its upper terminal, but can be selectively set by the wire 44 coming from the output of the range marker circuit 43. In sequence, the slot logic circuit 30 during the aircraft's own time slot puts out a signal on wire 34 at the beginning of its time slot, and thereafter puts out a pulse on the wire 39 at the predetermined moment of transmission after the beginning of the time slot. The latter signal passes through the gate 37 and actuates the range marker encoder 43 to deliver an output signal to drive the stationkeeper transmitter 40, these signals comprising pulse pairs. The appearance of the first pulse from the encoder 43 then drives the wire 44 to set the flipflop 47 and enable the gate 48. Thus, at the predetermined moment in the local aircraft's time slot number 46 the range marker encoder is triggered to drive the transmitter 40 through the duplexer 42 and place the local aircraft's own range marker signals on the air, while at the same time setting the flipflop 47 to begin counting pulses at one-half the pulse generator rate into the reversible range counter 45 to count it upwardly.

The range marker pulse group from the encoder 43 serves two functions. First, it enables the stationkeeping equipment of all participating aircraft to locate the position of the present aircraft using stationkeeping equipment whose functions are not shown in the present diagram but are well known in the prior art. Secondly, the range marker signal from the local aircraft acts as an interrogation signal to the aircraft A occupying slot 53 because that aircraft has selected the local aircraft as its synchronizee using its own slot logic 30. Thus, the encoded output from the transmitter 40 is a range marker signal to all aircraft and at the same time an interrogation signal to the aircraft occupying slot number 53. As soon as that interrogation signal is received by the aircraft A, it transponds using its own beacon transponder system, and the local aircraft receives the transponder reply through its receiver 41 and decodes the reply pulse group to provide a signal on wire 55. The signal on wire 55 resets the flipflip 47 and thereby blocks the gate 48 to stop the pulses from the divider 52 from counting the reversible range counter upwardly any further. The range counter 45 then holds this count which comprises two-way range counted at half the pulse generator rate, which is equivalent to one-way range counted at the full rate of the pulse generator 50.

The synchronizing system then does nothing through slots 47, 48, 49, 50, 51 and 52, but in the synchronizor's slot 53 which is selected by the switch 33 the slot logic circuit enables the wire 36, which at the same time enables the AND gate 56, the AND gate 57, and the delay 58. Since the upper terminal of the AND gate 56 is enabled during the entire time slot 53, when the time cycle counter 26 of the local aircraft reaches the predetermined moment which is known to be the moment of transmission of the range marker from the aircraft A, an output pulse will appear on the wire 39 and will pass through the AND gate 56 to set the flipflop 60 and thereby enable the AND gate 61. Pulses from the pulse generator 50 then begin entering the reversible range counter 45 at the full rate of the generator 50 while at the same time counting the range counter 45 downwardly toward zero. If the clock synchronization in the local aircraft is perfect with respect to the clock in the aircraft A, the reversible range counter will go through zero count and will put out an output on zero-count wire 62 at the precise moment when the stationkeeping receiver 41 in the local aircraft receives the range marker pulse from the aircraft A on wire 55, whereby the pulse passing through the AND gate 57 on wire 55 will enter the comparator 63 at exactly the same instant as the zero count pulse on wire 62 so that there will be no error.

On the other hand, if the receiver 41 receives the pulse from the aircraft A on wire 55 earlier than the pulse arrives on wire 62, it will show that the local clock is running late, and therefore a positive signal voltage will appear on wire 64 and can be gated through to drive the early/late circuit 65 to put out a correction signal to correct the second time keeping means in either FIG. 1 or FIG. 2 so as to shift the synchronization thereof to an earlier real-time position.

Conversely, if the zero count on wire 62 arrives before the received signal from the aircraft A on wire 55, then the comparator 63 will put out a negative signal on wire 64 causing the early/late circuit 65 to deliver a corrective signal to shift the second time keeping means in either FIG. 1 or FIG. 2 in such a way as to make the clock run later. Assuming that the signal on wire 64 is an analog signal, when it is zero the synchronization of the local time keeping means with respect to the corresponding means in aircraft A appears perfect.

However, when the difference in time of occurrence of the signals on wires 55 and 62 as determined in the comparator 63 exceeds a certain preset tolerance, in this example 2 microseconds, then it can be said that the clock error, whether plus or minus, is dangerously high and the pilot should be warned and should begin checking. One way of checking to determine which aircraft or ground station is in error is by voice communication, this matter being again discussed below. If the comparator 70 also detects an error in excess of two microseconds between the first and second clock counters 22 and 26, the system will then revert to enabling the AND gates 24 to force the count of the first clock counter 22 into the second clock counter 26, as described again hereinafter.

The delay circuit 58 is actuated at the beginning of the time slot assigned to the synchronizor aircraft, namely time slot 53, and this delay will eventually run out so as to place a signal on the wire 51 and reset the flipflop 60 a predetermined number of microseconds later, this delay being selected to always be greater than the maximum time it should take the pulses from the pulse generator 50 to count the range counter 45 back down through zero, i.e., at least equal to the maximum one way range delay between the aircraft which the system is designed to accommodate, i.e., the number of microseconds therefore being at least equal to 6.2 times the maximum number of miles separation between aircraft over which the system is designed to function. The delay circuit 58 is used to allow time enough for the reversible range counter always to be counted back through zero before the delay 58 runs out. Thereafter the delay circuit 58 resets the flipflop 60 to stop any more pulses from entering the reversible counter 45, whereby a zero count signal will always appear on wire 62 sometime during the time slot assigned to the synchronizor. The arrival of this signal on wire 62 is compared with the time of arrival of the synchronizor's signal on wire 55 by the comparator 63, and the early/late circuit 65 then issues a correction signal.

In FIG. 1 where the second time keeping means includes its own independent clock oscillator 25 driving the timing slot counter 26, the output of the early/late circuit 65 comprises merely a plus or minus signal on the wire 65a delivered to the oscillator correct circuit 28 which in turn puts out a control level on wire 28a to drag the phase of the oscillator 25 to correct the second clock means. Conversely, in FIG. 2 where the second time keeping means has been simplified by driving the second timing slot counter 26 from the pulse output of the first clock oscillator 21, the pulses from the latter are passed through a correction circuit 29 and delivered to the counter 26 via the wire 29a. In this latter embodiment a modified type of early/late circuit 84 is employed which has two outputs on wires 85 and 86 respectively to delete an oscillator pulse from the wire 29a when the clock is running early or to add a pulse to the wire 29a when the clock is running late. Both of the above techniques are within the present skill of the prior art and therefore will not be further elaborated.

Assuming that the second time keeping means has synchronized itself to the time kept in the leading aircraft A. The local synchronizing system now does nothing from slot 53 through slot 98. However, in slot 99 the wire 35 is energized during the entire time slot, thereby enabling the beacon transponse reply circuit 68 which comprises an encoder for encoding a pulse pair for transmission whenever it receives a signal from the synchronizee aircraft in slot 99. Thus, at the predetermined moment in slot 99 the aircraft B transmits its own range marker signal which also is its interrogation signal to the local aircraft, and this signal appears on wire 55 when received by the local aircraft and triggers the beacon transponse reply circuit 68 to deliver a pulse pair on wire 69 which pair is then transmitted by its stationkeeper transmitter 40 through the duplexer 42, thereby to replay through its antenna 43 to the aircraft B. Aircraft B then uses its own reversible range counter to determine its range to the local aircraft occupying slot number 46, which it has selected as its synchronizor in the same way as was just described for the present aircraft when synchronizing to the aircraft A which preceeds it.

When slot number 99 ends, the enabling signal disappears from the wire 35 and the synchronizing system then does nothing until slot number 46 again occurs during the next cycle. Since the repeating cycle of time slots is in effect circular, it makes no difference as to whether the slots are assigned in numerical sequence to the aircraft, or whether they are assigned in a purely random manner. During its own time slot the aircraft always sends out its own range marker pulse which also serves as an interrogation of the aircraft to which it is to synchronize, and it then waits during the cycle of time slots until the next time that that aircraft's slot occurs, at which time it counts its own counter back down again through zero. It therefore does not matter whether or not the leading aircraft has ahigher or a lower slot number in the cyclic succession of slots. Likewise, it does not matter whether its synchronizee aircraft slots preceed or follow the local aircraft's assigned slot in view of the fact that all these slots occur once during each complete cycle of time slots.

It is also not essential that each aircraft synchronize itself to a different aircraft located ahead of it. For instance, in a formation of aircraft one aircraft might be the master aircraft for all of the other aircraft, for instance in the general way suggested in Fletcher et al. U.S. Pat. No. 3,153,232, in which all of the slave aircraft are synchronized to the same master. The only changes that would be necessary would be that the master aircraft select all of the time slots, other than its own as synchronizee time slots, meaning that its beacon transponder wire 35 should be enabled in all time slots except its own time slot. Also, its circuit should be further altered in such a way that it never synchronizes itself to another aircraft, but instead synchronizes itself only to the ground stations. This would be accomplished in the master aircraft by breaking the wire 28a and by continuously enabling the AND GATES 24.

REDUNDANCY

Instrumentation in aircraft is often installed with redundancy of function in mind, many units being duplicated to the extent of having a sufficient degree of redundancy to make operation of the aircraft safe despite failures in one of the duplicated units. In the present disclosure the use of two separate time clocks is desirable, the system of FIG. 1 showing completely independent clocks including a first aircraft clock means, oscillator 21 and counter 22 synchronized with the ground master clock 10; and a similar second clock means, oscillator 25 and counter 26 synchronized with corresponding second clock means in a nearby aircraft, which is also similarly equipped with a ground synchronized first clock means. In FIG. 2 the redundancy is reduced somewhat by use of a common clock oscillator 21, but otherwise the systems are similar.

In FIGS. 1 and 2 the second time keeping means 26 is checked against two different clock sources to determine the degree of its synchronization with respect to each. For this purpose the second timing chain counter 26 has its output fed by way of cable 27 into a local timing chain comparator 70 which as stated previously also receives the output of the local first clock counter 22 entering the comparator 70 via the cable 23. At every moment the timing chain comparator 70 has an output either on wire 71 indicating that the first and second clock counters check within 2 microseconds of each other, or alternatively an output on wire 72 which indicates that the degree of synchronization is outside of that tolerance and the error between the first clock means and the second time keeping means is greater than 2 microseconds.

Moreover, the second time keeping counter 26 in the local aircraft is also checked against the corresponding second time keeping means in the synchronizor aircraft A to which it is supposed to be even more closely synchronized, and this comparison is made in the time of occurrence comparator 63, separately from the comparator 70. As discussed above, the output of the comparator 63 appears as an analog signal on wire 64 which has either a plus or a minus value depending on the sense and magnitude of the error between the local second counter 26 and the similar clock means in the synchronizor aircraft A. However, the comparator circuit 63 also has two other outputs, an output on the wire 66 indicating that the error between the second time keeping means in the local aircraft and the second clock means in the synchronizor aircraft A does not exceed 2 microseconds, or alternatively an output on wire 67 indicating that the error is outside of the two microseconds tolerance. Thus, the present system provides four possible combinations using the alternative outputs from the two comparators 63 and 70 as follows:

A first possible combination occurs when an output on wire 72 and a simultaneous output on wire 67 indicate that the error is greater than two microseconds both when comparing the local second time keeping means 26 with the local first clock means 21, 22 which is supposedly synchronized with the master ground clock, and also when comparing the second time keeping means in the local aircraft with the corresponding clock means in the synchronizor aircraft A. This condition might occur when the equipment is first turned on, or after a momentary power failure, etc.

A second possible combination occurs when the local second time keeping means is within 2 microseconds of the local first clock means as indicated by an output on wire 71, but there is an error greater than 2 microseconds when the local second time keeping means is compared with the corresponding clock means in the synchronizor aircraft A, this condition being indicated by an output on wire 67 occurring together with said output on wire 71.

A third possible combination occurs when outputs on wires 71 and 66 indicate that the second time keeping means 26 is within the 2 microsecond tolerance with respect both to its own first clock means 21, 22 and also with respect to the second clock means in the synchronizor aircraft A, i.e., satisfactory synchronization in both cases.

Finally, the fourth possible combination occurs if something happens to the aircraft's first clock and synchronizing means, or if it loses synchronization with the ground station due, for example, to loss of signal therebetween, or if the ground station experiences a failure of its own, etc. In this case, a signal on wire 66 may still indicate satisfactory synchronization between the local second time keeping means and the second clock means of the synchronizor aircraft A, but a signal on wire 72 would indicate a difference greater than 2 microseconds when the local second time keeping means is compared with the local first clock means 21, 22.

Taking the four possible combinations just related in sequential order, consider first the situation where simultaneous signals appear on wires 67 and 72, indicating that the local second time keeping means 26 is outside of the two microsecond tolerance both with respect to its own first clock means and also with respect to the second clock means in the synchronizor aircraft A. This condition might occur, for example, when the system is first turned on, or it might occur after a brief failure in the local aircraft, or for other conceivable reasons. Whatever the reason, the outputs on the wires 67 and 72 together enable the AND gate 73 which delivers an output on wire 74. This output then enables the plurality of AND gates 24 and connects, stage-by-stage, the outputs of the time cycle and slot counter 22 of the ground synchronized first clock means directly into the corresponding stages of the local second time-cycle and slot counter 26 which is similar in electronic circuitry and by this action has forced upon it the same instantaneous reading as the counter chain 22. Thus, synchronization of the counter 22 to the counter 26 is immediately accomplished with the result that the output disappears from wire 72 of the comparator 70, thereby disabling the gate 73. The local second time keeping means therefore acquires the same degree of synchronization with respect to the master ground station clock 10 as is currently being enjoyed by the aircraft's first clock means 21, 22. It is assumed that the latter clock means is properly synchronized at the moment. Moreover, if at any time during the flight the second time keeping means 26 is discovered to be out of tolerance as determined both by the comparators 63 and 70, the second time keeping means 26 will immediately be reset to match the first clock means 21, 22 thereby to restore reasonable synchronization.

Since the local second time keeping means has not been synchronized with the local first clock means, an output will appear on the wire 71 so that either the second possible condition may exist or else the third possible condition may exist, depending on whether or not the resetting of the second time keeping means also brought it into synchronism with the second clock means in the synchronizor aircraft A.

For the moment, assume that the second possible condition exists and that, therefore, the local second clock means approximately matches the local first clock means within tolerance, but is still more than two microseconds out with respect to the synchronizor aircraft. When this occurs, the AND gate 75 will therefore be enabled by outputs on wires 71 and 67, thereby enabling output on the wire 76 which passes through the OR gate 77 and enables the AND gate means 78 at its lower terminal. Meanwhile, the time of occurrence comparator 63 has been comparing in the manner set forth above to determine whether the local second time keeping means is early or late with respect to the second clock means in the synchronizor aircraft A. Either a plus or a minus signal appears on wire 64 and passes through the AND gate means 78 and actuates the early/late circuit to deliver an output as a correction signal to correct the second time keeping means. In FIG. 1 the early/late circuit 65 delivers a signal on wire 65a to the correction circuit 28, thereby to drag the local second clock oscillator 25 to achieve closer synchronism with the second clock means in the synchronizor aircraft; whereas in FIG. 2 the early/late circuit 84 delivers either a "delete" signal on wire 85 or an "add" signal on wire 66 to alter the count in the counter 26. In either event, since both aircraft second clock means are supposed to be synchronized with their first clock means 21, 22 which, in turn are supposed to be synchronized with the master clock 10 on the ground, the error between the second time keeping means in the local aircraft and the second clock system in the synchronizor aircraft should be relatively small. In most cases the error will become less than 2 microseconds at the same time that the AND gates 24 force the reading of the counter 22 into the counter 26 as related above. Nevertheless, even if an error of more than two microseconds exists when the local clock means are mutually synchronized, small corrections over the next few cycles of time slots should be enough to bring the local second time keeping means 26 in the present aircraft into step with the corresponding clock means in aircraft A.

When eventually the third possible combination occurs and these clock means are all mutually synchronized within tolerance as determined by both comparators 63 and 70, output signals on wires 66 and 71 will indicate this fact and as a result enable the gate 80 to put out an output signal on wire 81, which signal passes through the OR gate 77 and enables the AND gate means 78. Thus no change occurs in the setup of the system because the AND gates 24 remain blocked whereas the gate system 78 remains enabled so as to allow small corrections of the second time keeping means 26 to occur continuously. This condition represents the expected normal operating status of the system, and should continue at all times after the initial turn-on and synchronization acquisition period have ended.

However, the fourth possible combination of outputs represents a troublesome condition which can result if something happens to either the ground station clock 10, the ground station transmissions through the antenna 14, or the first aircraft clock means including its synchronizor 20. The fourth condition represented by outputs on wires 66 and 72 may also occur as a result of mere loss of signal with the ground station through the path P. If any of these failures occurs, affecting the condition of synchronization of the local first clock means by shifting it outside of the two microsecond tolerance, the situation will evidence itself by continued favorable comparison outputs from comparator 63 on wire 66, accompanied by unfavorable output from the comparator 70 on wire 72, these two outputs indicating that the local second time keeping means is closely synchronized with its synchronizor aircraft A, but is at odds with its own first clock means 22 and/or with the master clock at the ground station 12. This fourth situation, however, calls for continuing to preserve close synchronization with the aircraft A by enabling the gate 79, as well as continued blocking of the AND gates 24, since their enabling would tend to unsynchronize the local clock 25 with the clock means in the synchronizor aircraft.

The system is provided with two alarms 82 and 83. The alarm 82 is connected directly to the wire 67 and is operative to warn the pilot whenever local synchronization falls out of tolerance with respect to the synchronizor aircraft A, whereas the alarm 83 is connected to the output on wire 72 and is operative to warn the pilot whenever synchronization fails as between the two clocks in the local aircraft, one of which is supposedly directly synchronized with the ground station master clock 10. In view of the fact that the local aircraft is flying close to the aircraft A which is synchronizing it, it is certainly undesirable to interrupt what is apparently satisfactory synchronization with that nearby aircraft, and therefore the gate 80 is used to enable the gate means 78. On the other hand, whenever either of the alarms 82 or 83 is actuated, it indicates trouble somewhere in the system, either aboard the local aircraft, aboard a nearby synchronizor aircraft, or some sort of failure of synchronization with the ground station master clock 10 on the part of one or both of the aircraft. Whichever type of situation is indicated by the alarm, it is presumed that the pilot will take immediate steps to increase his watchfulness for the purpose of collision avoidance and that he will begin immediately attempting to track down the cause of the error by communicating with other aircraft and/or with the ground station.

The system should be provided with manual override selection means, for instance to permit the pilot to continuously enable the gates 24 while blocking the gate system 78, or vice-versa, so that he can select whichever form of synchronization appears to be the best, pending elimination of what is causing the failure. For example, if by voice communication the pilots establish that the leading synchronizor aircraft A has experienced failure with the ground station and is embarking on a time base of its own which is no longer also synchronized with the ground station, the local pilot can manually enable the AND gate 74 and block the gate system 78 so as to return his aircraft clock means, as well as the clock means of all other aircraft deriving synchronization through his clock means, to proper synchronization with respect to the master time propagated by the ground station. In this way, deviation of his synchronizor aircraft from master time can be prevented from causing failure of synchronization with respect to the ground station of all other aircraft deriving synchronization through him. Conversely, if the ground station has somehow failed, or a group of aircraft have passed beyond radio contact with it, and the pilots have determined this fact by voice communication or by such other means as may be available, they should then be able to manually block the gates 24 while manually enabling the gate means 78 so that the aircraft can continue on a local mutually synchronized time cycle of their own, so that they can avoid mutual collision even though no longer synchronized with any ground station master time.

Other modifications of the system are of course contemplated, for instance other means for actually measuring the range between aircraft could be employed aside from the particular reversible counter embodiment employed for illustrative purposes in the present disclosure. Other changes are also reasonably to be expected in the system by which the outputs of the comparators 63 and 70 are employed to provide efficient use of the synchronization capabilities of the system disclosed. In particular, variations are possible with regard to determining the circumstances under which the second time keeping means should be synchronized on the one hand with the first clock means, and on the other hand with the clock means in a nearby aircraft. Accordingly, the present invention is not to be limited to the specific illustrative embodiment, for changes may be made within the scope of the following claims.

I claim:

1. In an air traffic control system of the type including common master clock means counting out repeating cycles of time slots and including multiple participating aircraft each having local time keeping means including means for counting out similar cycles of slots and each aircraft uniquely occupying a designated one thereof, the system comprising in each aircraft:
    a. first and second time keeping means, said first time keeping means comprising a first time clock and said second time keeping means including at least a separate time cycle and slot counter;
    b. synchronizing means cooperative with the common master clock means and operative at all times for synchronizing the aircraft's first time clock therewith;
    c. first correcting means operative when enabled to set the local second time keeping means to match the local first time clock;
    d. means for exchanging pulses with said another participating aircraft and including a second correcting means operative when enabled to synchronize the local second time keeping means with that aircraft's time keeping means;

e. first comparator means for comparing the local first and second time keeping means to determine their degree of mutual synchronization;

f. second comparator means for comparing the local second time keeping means with the corresponding means in said another aircraft to determine the degree of their mutual synchronization based on the exchange of pulses therebetween; and g. means selectively operable in response to the degrees of synchronization determined by said first and second comparator means to selectively enable said first and second correcting means.

2. In a system as set forth in claim 1, said master clock means being located at participating ground stations common to the system and said first time keeping clock including oscillator means and counter means in each aircraft substantially continuously synchronized thereto, predetermined tolerance means associated with each comparator means which also includes means for delivering outputs from the comparator means indicating respectively whether or not the local second time keeping means is within tolerance when compared with the local first clock, and also whether or not it is within tolerance when compared with the second time keeping means in said another aircraft, and selective enabling means responsive to out-of-tolerance outputs from both local comparator means to enable the first correcting means to set the local second time keeping means to match the local first clock.

3. In a system as set forth in claim 2, said second time keeping means comprising a second clock oscillator driving said time cycle and slot counter independently of said first time clock.

4. In a system as set forth in claim 2, said second time keeping means comprising said time cycle and slot counter coupled to be driven by the oscillator means of the first time keeping means.

5. In a system as set forth in claim 2, said selective enabling means being responsive to outputs from the two comparator means indicating the local second time keeping means to be within tolerance as determined by both comparator means to disable said first correcting means and to enable said second correcting means.

6. In a system as set forth in claim 2, said selective enabling means being responsive to outputs from the two comparator means indicating the local second time keeping means to be within tolerance with respect to the local first clock but outside of tolerance with respect to the second time keeping means in said another aircraft to disable said first correcting means and to enable said second correcting means.

7. In a system as set forth in claim 2, said selective enabling means being responsive to outputs from the two comparator means indicating the local second time keeping means to be outside tolerance with respect to the local first clock but within tolerance with respect to the second time keeping means in said another aircraft to disable said first correcting means and to enable said second correcting means.

8. In a system as set forth in claim 2, said local second time keeping means including its own independent controlable-rate clock oscillator and said second comparator means determining an error signal, and said second correcting means including oscillator correcting means responsive to said error signal and operative to correct the rate of the latter clock oscillator.

9. In a system as set forth in claim 2, said local second time keeping means including said time cycle and slot counter coupled to be driven by pulses from the oscillator means of the first time keeping means, and said second correcting means including means responsive to said error signal to selectively delete or add drive pulses with respect to those provided by the oscillator means.

10. In a system as set forth in claim 2, alarm means respectively coupled to each comparator means and each rendered operative by an output indicating the local second time keeping means to be outside of tolerance as determined by the associated comparator means.

11. In an air traffic control system of the type including common master clock means counting out repeating cycles of time slots and including multiple participating aircraft each having local time keeping means including means for counting out similar cycles of slots and each aircraft uniquely occupying a designated one thereof and exchanging synchronizing signals with another aircraft uniquely occupying other designated slots and variously acting as synchronizor aircraft and as synchronizee aircraft, the system comprising in each aircraft:

a. first and second time keeping means, said first time keeping means comprising a first time clock and said second time keeping means including at least a separate time cycle and slot counter;

b. synchronizing means cooperative with the common master clock means and operative at all times for synchronizing the aircrafts's first time clock therewith;

c. first correcting means operative when enabled to set the local second time keeping means to match the local first time clock;

d. means for exchanging pulses with the local aircraft's designated synchronizor aircraft during their time slots and including a second correcting means operative when enabled to synchronize the local second time keeping means with the synchronizor aircraft's time keeping means;

e. means operative during slots occupied by synchronizee aircraft to transpond to pulses transmitted thereby to permit the synchronizee aircraft to improve the degree of synchronization of their second time keeping means with the second time keeping means in the local aircraft;

f. comparator means for comparing the local second time keeping means with the local first time clock to monitor the difference therebetween; and g. means selectively operable in response to the degrees of synchronization determined by said comparator means to selectively enable one of said correcting means.

12. In a system as set forth in claim 11, slot logic means in each aircraft driven by the local second time keeping means to cyclically select the local aircraft's own slot and the slots of predetermined synchronizor and synchronizee aircraft, said means to transpond being enabled by said slot logic means during each selected synchronizee slot; means enabled by said slot logic means during the local aircraft's own time slot for transmitting pulses for marking its own position and for interrogating the transpond means in its own synchronizor aircraft; means responsive to the synchronizor's transponded reply and responsive to the time of reception of the synchronizor's position marking pulse according to the local aircraft's second time keeping means for determining the difference between the second time keeping means in the local aircraft and in the synchronizor aircraft, and said second correcting means including means responsive to said determined difference for correcting the local second time keeping means to reduce said difference.

13. In a system as set forth in claim 11, said comparator means including means for determining when said difference between the two local time keeping means is within a predetermined tolerance, and operative in response thereto to disable said first correcting means.

14. In a system as set forth in claim 13, alarm means responsive to a difference which exceeds said predetermined tolerance as determined by said comparator means.

* * * * *